United States Patent
Lai et al.

(10) Patent No.: US 7,540,783 B2
(45) Date of Patent: Jun. 2, 2009

(54) CARD CONNECTOR WITH TERMINAL PROTECTION

(75) Inventors: Yaw-Huey Lai, Taipei County (TW); Gwo-Bin Shiue, Taipei (TW)

(73) Assignee: Tai-Sol Electronics Co., Ltd. (TW)

( * ) Notice: Subject to any disclaimer, the term of this patent is extended or adjusted under 35 U.S.C. 154(b) by 0 days.

(21) Appl. No.: 12/073,375

(22) Filed: Mar. 5, 2008

(65) Prior Publication Data

US 2009/0104817 A1    Apr. 23, 2009

(30) Foreign Application Priority Data

Oct. 22, 2007    (TW) ............................... 96217672 U

(51) Int. Cl.
*H01R 24/00*    (2006.01)
(52) U.S. Cl. .................................................... 439/630
(58) Field of Classification Search ................. 439/630, 439/631
See application file for complete search history.

(56) References Cited

U.S. PATENT DOCUMENTS 3,934,120 A * 1/1976 Maymarev .................. 235/441
7,052,325 B2 * 5/2006 Lin et al. ..................... 439/630
7,232,343 B1 * 6/2007 Lai ............................. 439/630
2006/0219785 A1 * 10/2006 Sato ........................... 235/441

FOREIGN PATENT DOCUMENTS

TW    M249333    11/2004

* cited by examiner

*Primary Examiner*—Phuong K Dinh
(74) *Attorney, Agent, or Firm*—Bacon & Thomas, PLLC

(57) ABSTRACT

A card connector includes a housing defining multiple accommodation chambers, pressure boards respectively and vertically movably accommodated in the accommodation chambers, each pressure board having slots and rear bearing portions protruding over the top wall, and multiple sets of metal terminals mounted in the housing and respectively curving upwardly forwards in the accommodation chambers to support the respective pressure boards in the respective accommodation chamber. By means of the effect of the rear bearing portions of the pressure boards, the inserted memory card touches only the matching metal terminals and the other metal terminals that do not match are kept away from the inserted memory card, preventing damage.

6 Claims, 12 Drawing Sheets

CARD CONNECTOR WITH TERMINAL PROTECTION

BACKGROUND OF THE INVENTION

1. Field of the Invention

The present invention relates to electrical connection devices and more particularly, to a card connector that has means to protect the metal terminals.

2. Description of the Related Art

Currently, there are four types of commercial memory cards, including MS (Memory Stick), SD (Secure Digital), MMC (Multi-Media Card), and XD (extreme Digital). To facilitate the use of different memory cards, various multi-in-one card connectors are disclosed. A multi-in-one card connector generally has multiple sets of metal terminals mounted inside the housing at different locations corresponding to the contact ends of different memory cards so that different memory cards are insertable into the card connector.

In a multi-in-one card connector, all the metal terminals extend to the inside of the housing. When inserting one particular memory card into the housing, it may rub on or hit the sets of metal terminals that do not match accidentally, causing these metal terminals to be biased and affecting normal functioning of the card connector. Taiwan Patent Number M249,333 teaches the use of metal terminal protection means to prevent the aforesaid problem. According to this design, a pivoted safety cover is provided. The safety cover is biased to press on the other metal terminals that do not match upon insertion of one memory card. Therefore, the inserted memory card touches only the matching set of metal terminals, and the other sets of metal terminals are well protected.

However, because the safety cover of the aforesaid design is pivoted to the bottom housing of the card connector, it may wear quickly with a long time use. When the safety cover starts to wear, it may be unable to hold down the non-matching metal terminals or unable to return to its normal position. In this case, the card connector becomes useless.

SUMMARY OF THE INVENTION

The present invention has been accomplished under the circumstances in view. It is one object of the present invention to provide a card connector that assures accurate contact of the inserted memory card with the matching metal terminals, preventing damage to the other metal terminals that do not match the inserted memory card.

To achieve this and other objects of the present invention, the card connector comprises a housing, at least one set of metal terminals, and at least one pressure board. The housing has a front side, a rear side, at least one accommodation chamber defined therein between the front side and the rear side, and an opening formed in the front side in communication with the at least one accommodation chamber. The metal terminals each have a body projecting into the at least one accommodation chamber and curving upwardly forwards. The at least one pressure board is vertically movably mounted in the at least one accommodation chamber, each comprising a plurality of slots cut through top and bottom sides thereof and adapted for receiving the at least one set of metal terminals, and at least one bearing portion disposed at a rear side thereof and protruding over a top wall of the respective pressure board.

By means of the characteristic that each pressure board has at least one bearing portion disposed at the rear side and protruding over the top wall, the inserted memory card touches only the matching metal terminals and the other metal terminals that do not match are kept away from the inserted memory card, preventing damage.

DETAILED DESCRIPTION OF THE INVENTION

Figure 1:
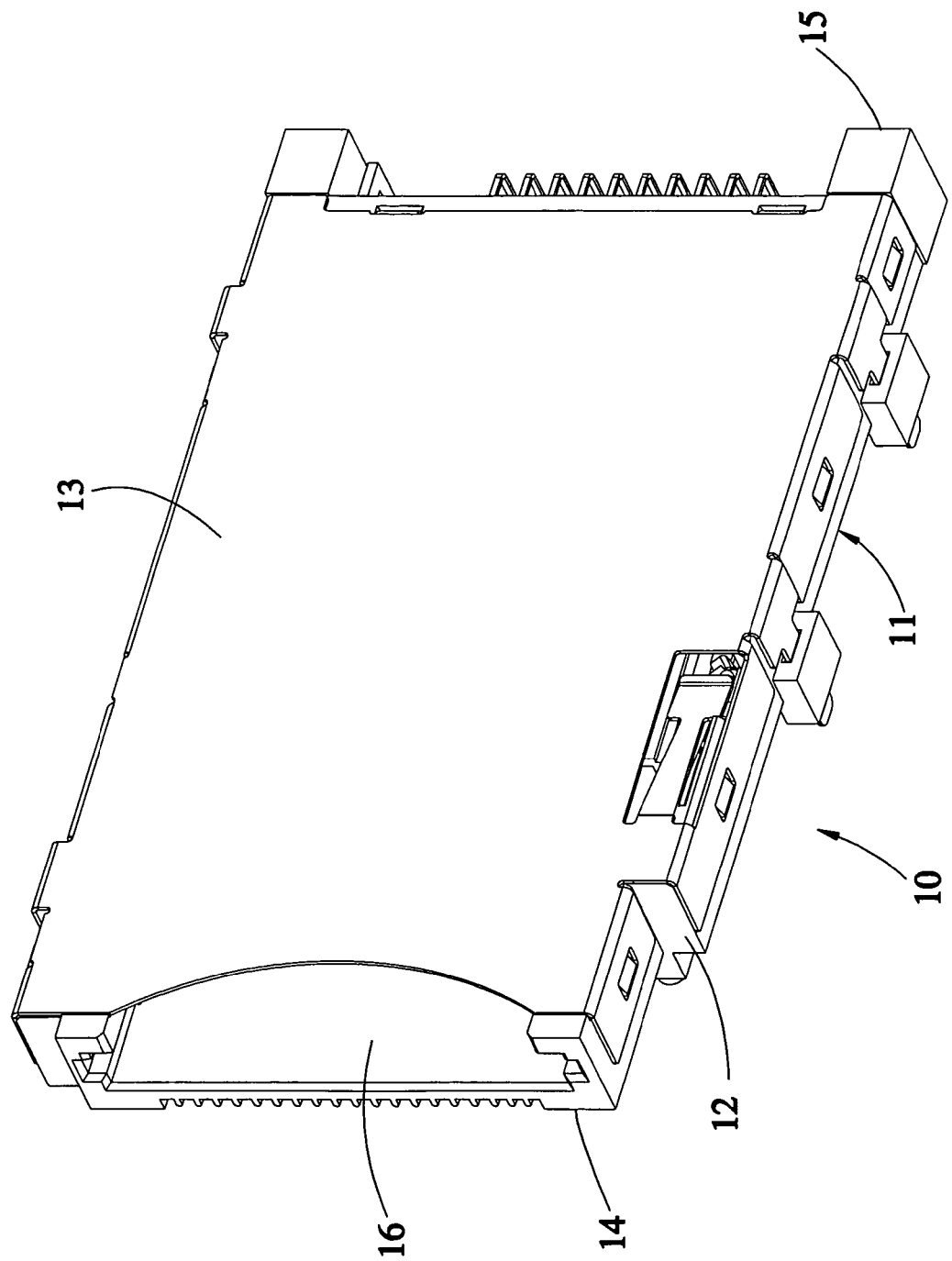
FIG. 1 is a perspective view of a card connector in accordance with the present invention.
Figure 2:
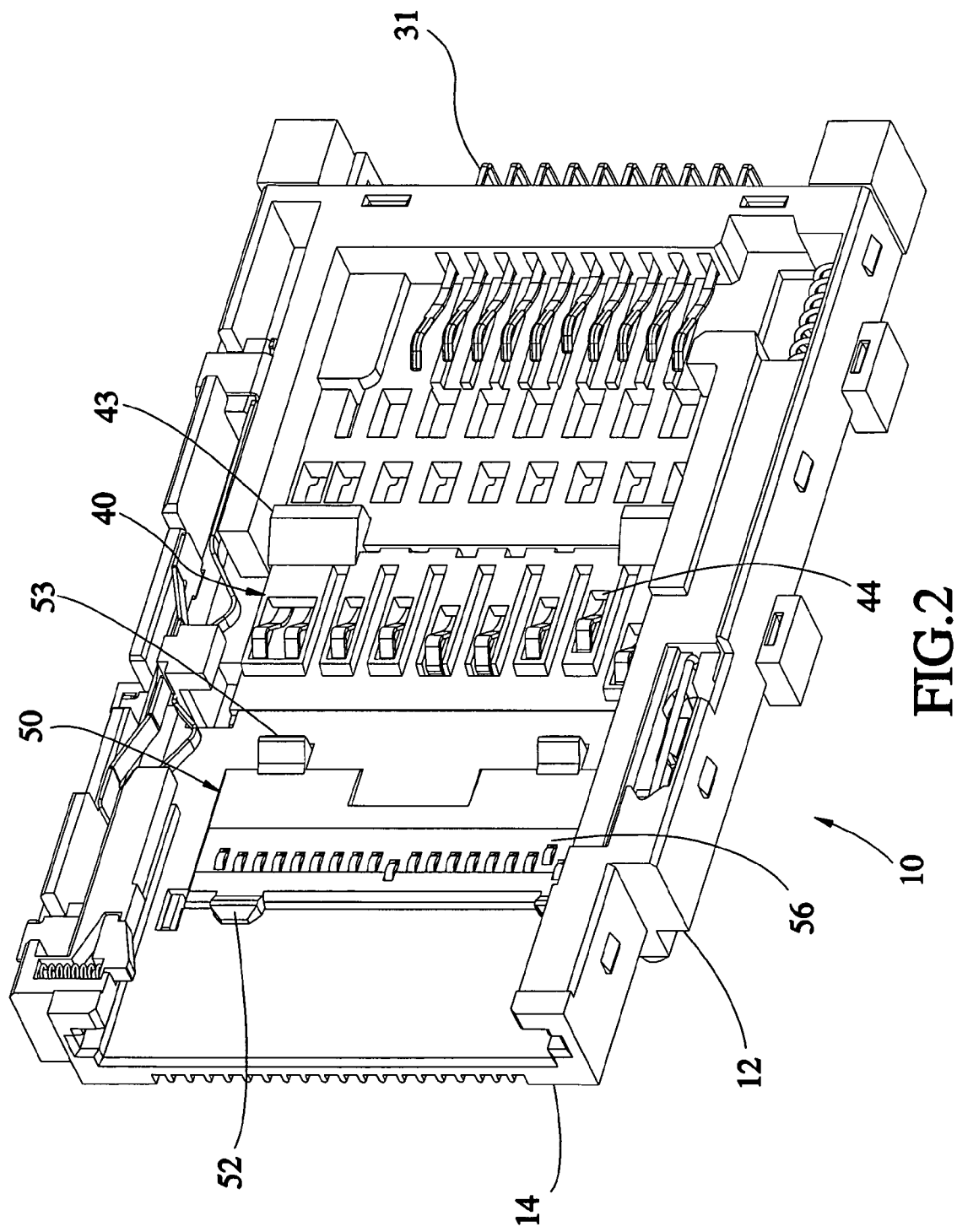
FIG. 2 illustrates the internal structure of the card connector in accordance with the present invention.
Figure 3:
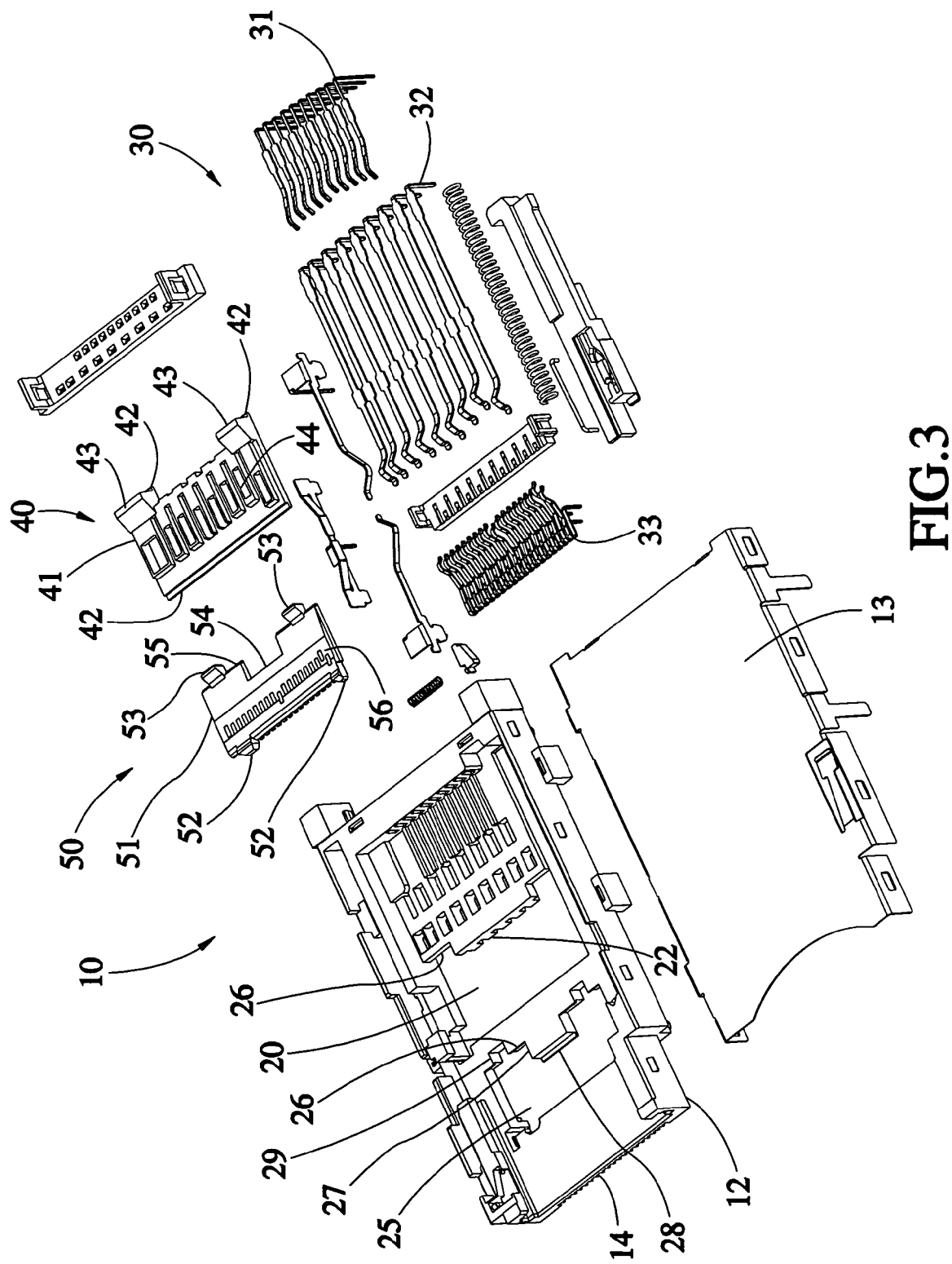
FIG. 3 is an exploded view of the card connector in accordance with the present invention.

Referring to FIGS. 1~3, a card connector 10 in accordance with the present invention is shown comprising a housing 11, three sets of metal terminals 30, a first pressure board 40, and a second pressure board 50.

The housing 11 is formed of a base frame 12 and a top cover 13. The housing 11 has a front side 14 and a rear side 15. The front side 14 defines an opening 16 for the insertion of a memory card. The base frame 12 comprises a first accommodation chamber 20, a second accommodation chamber 25, two steps 26 respectively protruded from the top edge of the peripheral wall of the first accommodation chamber 20 and the top edge of the peripheral wall of the second accommodation chamber 25 and respectively suspending in the first accommodation chamber 20 and the second accommodation chamber 25, a first protrusion 22 protruded from the step 26 in the first accommodation chamber 20, a second protrusion 27 protruded from the step 26 in the second accommodation chamber 25, two notches 29 formed on the step 26 in the second accommodation chamber 25 at two sides of the second protrusion 27, and stop edge 28 at the bottom side of the second protrusion 27.

The three sets of metal terminals 30 are mounted in the housing 11, including a set of first metal terminals 31, a set of second metal terminals 32 and a set of third metal terminals 33. These three sets of metal terminals 30 respectively extend from the base frame 12 to the space in between the base frame 12 and the top cover 13. The first set of metal terminals 31 is mounted in the rear side 15 of the base frame 12 for the connection of a MS (Memory Stick) card. The set of second metal terminals 32 is mounted in the bottom side of the base frame 12 for the connection of a SD (Secure Digital) or MMC (Multi-Media Card) card. The second metal terminals 32 extend into the first accommodation chamber 20 and then curve forwardly upwards and then slightly downwards. The set of third metal terminals 33 is mounted in the bottom side of the base frame 12 near the front side 14 for the connection of a XD (eXtreme Digital) card. The third metal terminals 33 extend into the second accommodation chamber 25 and curves forwardly upwards.

Figure 5:
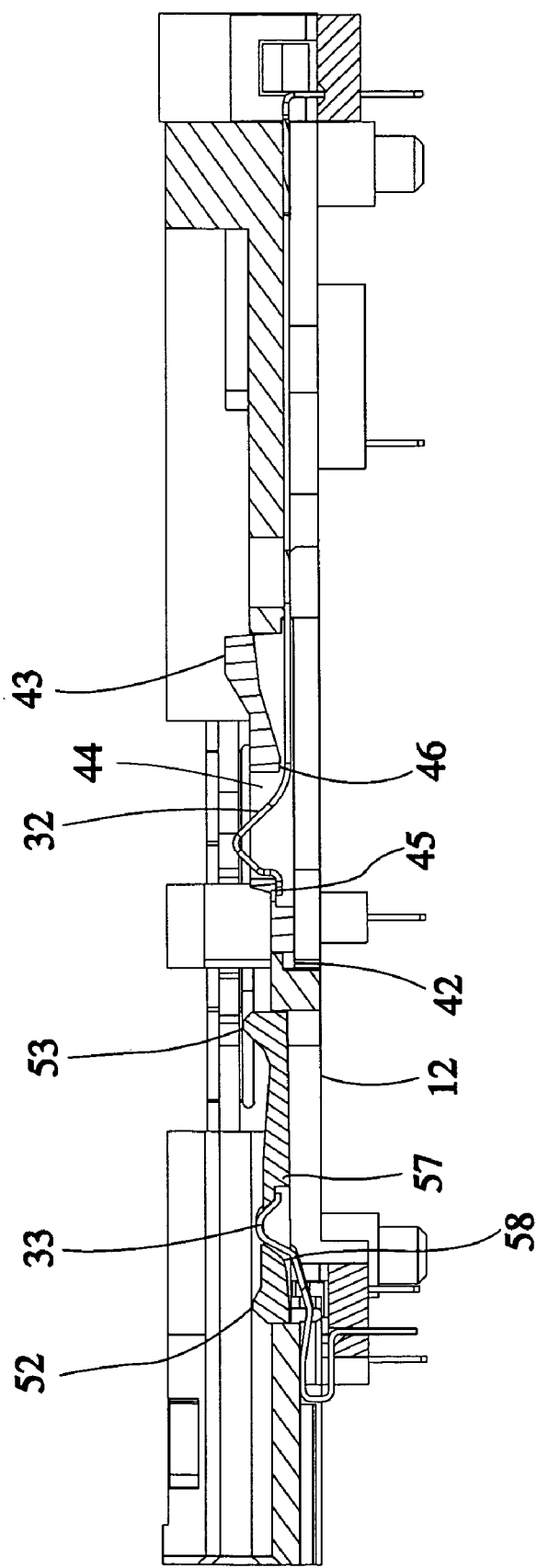
FIG. 5 is a sectional view taken along line 5-5 of FIG. 4.

Referring to FIG. 5 and FIG. 3 again, the first pressure board 40 comprises a first board body 41 that has a configuration fitting the first accommodation chamber 20, two first bearing portions 43 disposed at one side, namely, the rear side of the first board body 41, and a plurality of shoulders 42 respectively disposed at the other side, namely, the rear side of the first board body 41 and the bottom side of each of the first bearing portions 43. The first bearing portions 43 protrude over the top wall of the first board body 41. The first board body 41 further has a plurality of first elongated slots 44, a first support portion 45 at the front bottom side of each first elongated slot 44, and a first press portion 46 at the rear bottom side of each first elongated slot 44.

Figure 4:
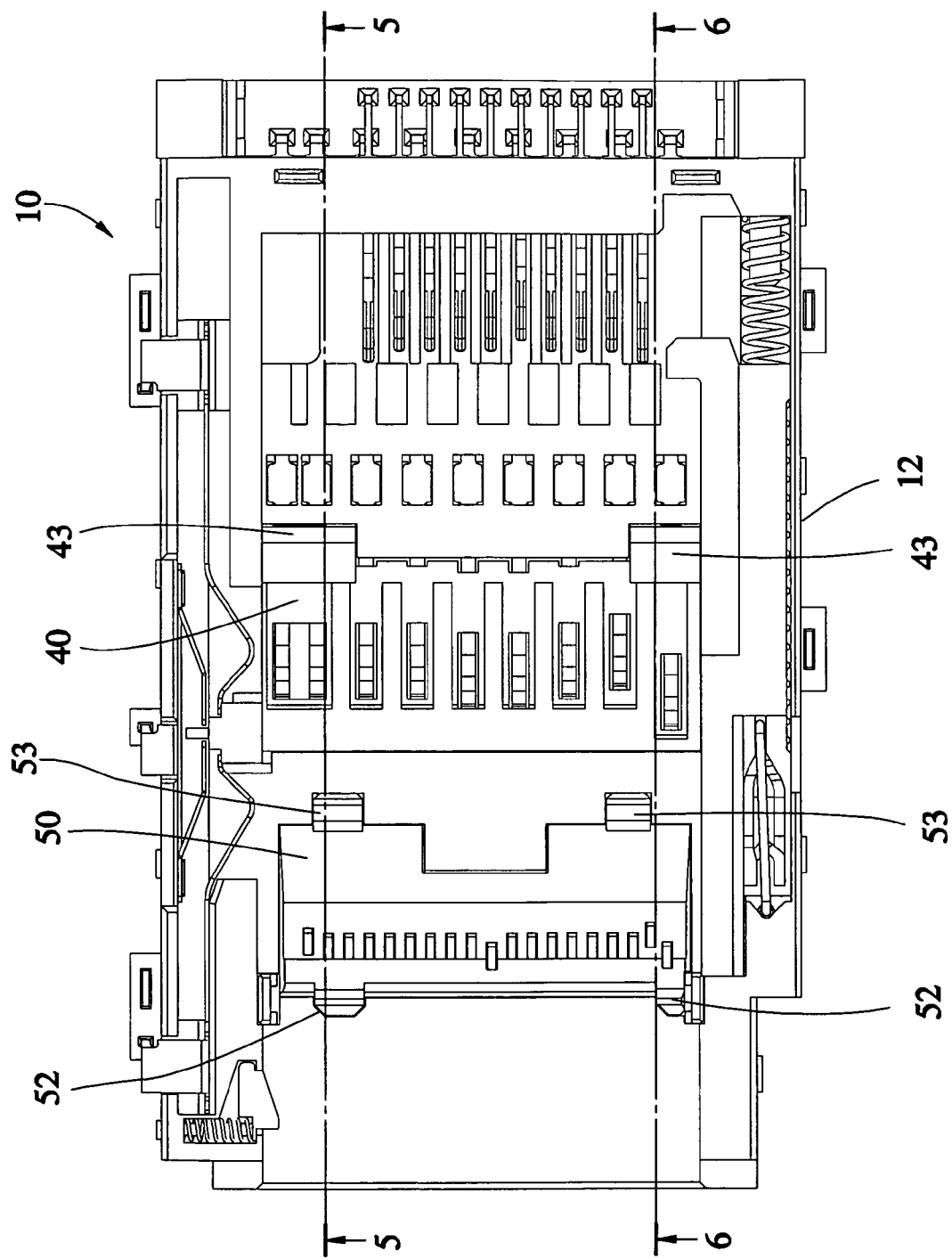
FIG. 4 is a top view of the card connector in accordance with the present invention after removal of the top cover.
Figure 6:
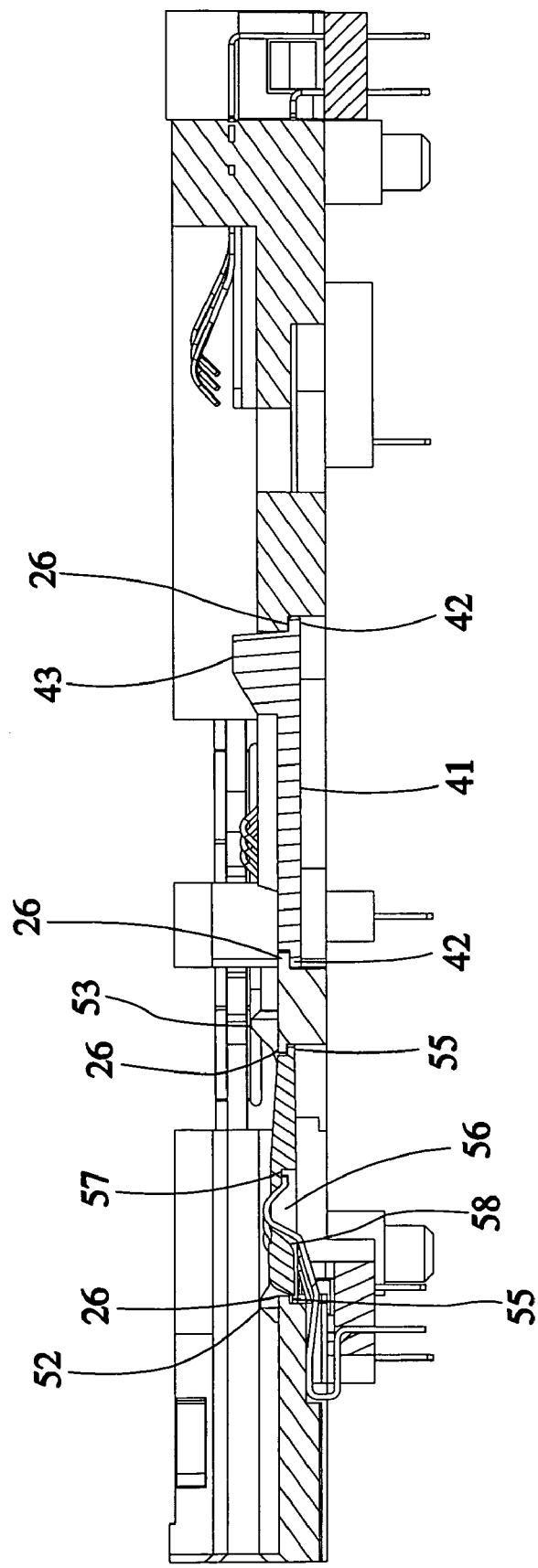
FIG. 6 is a sectional view taken along line 6-6 of FIG. 4.

Referring to FIG. 6 and FIG. 4 again, the first pressure board 40 is mounted in the first accommodation chamber 20 inside the base frame 12, holding the two first bearing portions 43 at two sides of the first protrusion 22. The second metal terminals 32 extend upwardly through the first elongated slots 44 and are stopped against the respective first support portions 45 to lift the first pressure board 40, keeping the first bearing portions 43 in proximity to the rear side 15 of the housing 11. Further, when the first pressure board 40 is lifted by the spring power of the second metal terminals 32, the shoulders 42 will be stopped against the step 26 in the first accommodation chamber 20 and therefore the first pressure board 40 will never escape out of the first accommodation chamber 20.

The second pressure board 50 comprises a second board body 51 that has a configuration fitting the second accommodation chamber 25, two shoulders 55 respectively disposed at the front bottom side and rear bottom side of the second board body 51, two protruding guide portions 52 bilaterally disposed at the front side of the second board body 51, two second bearing portions 53 bilaterally disposed at the rear side of the second board body 51, and a locating notch 54 disposed on the middle of the shoulder 55 at rear side of the second board body 51 between the two second bearing portions 53. The protruding guide portions 52 and the second bearing portions 53 protrude over the top wall of the second board body 51. The second board body 51 further has a plurality of second elongated slots 56, a second support portion 57 at the front bottom side of each second elongated slot 56, and a second press portion 58 at the rear bottom side of each second elongated slot 56.

The second pressure board 50 is mounted in the second accommodation chamber 25 inside the base frame 12, holding the two second bearing portions 53 in the notches 29 and having the locating notch 54 receive the second protrusion 27. The third metal terminals 33 extend upwards through the second elongated slots 56 and are stopped against the second support portions 57 to lift the second pressure board 50. Further, as shown in FIG. 5, when the second pressure board 50 is lifted by the spring power of the third metal terminals 33, the shoulders 55 will be stopped against the step 26 in the second accommodation chamber 25 and therefore the second pressure board 50 will never escape out of the second accommodation chamber 25.

Figure 7:
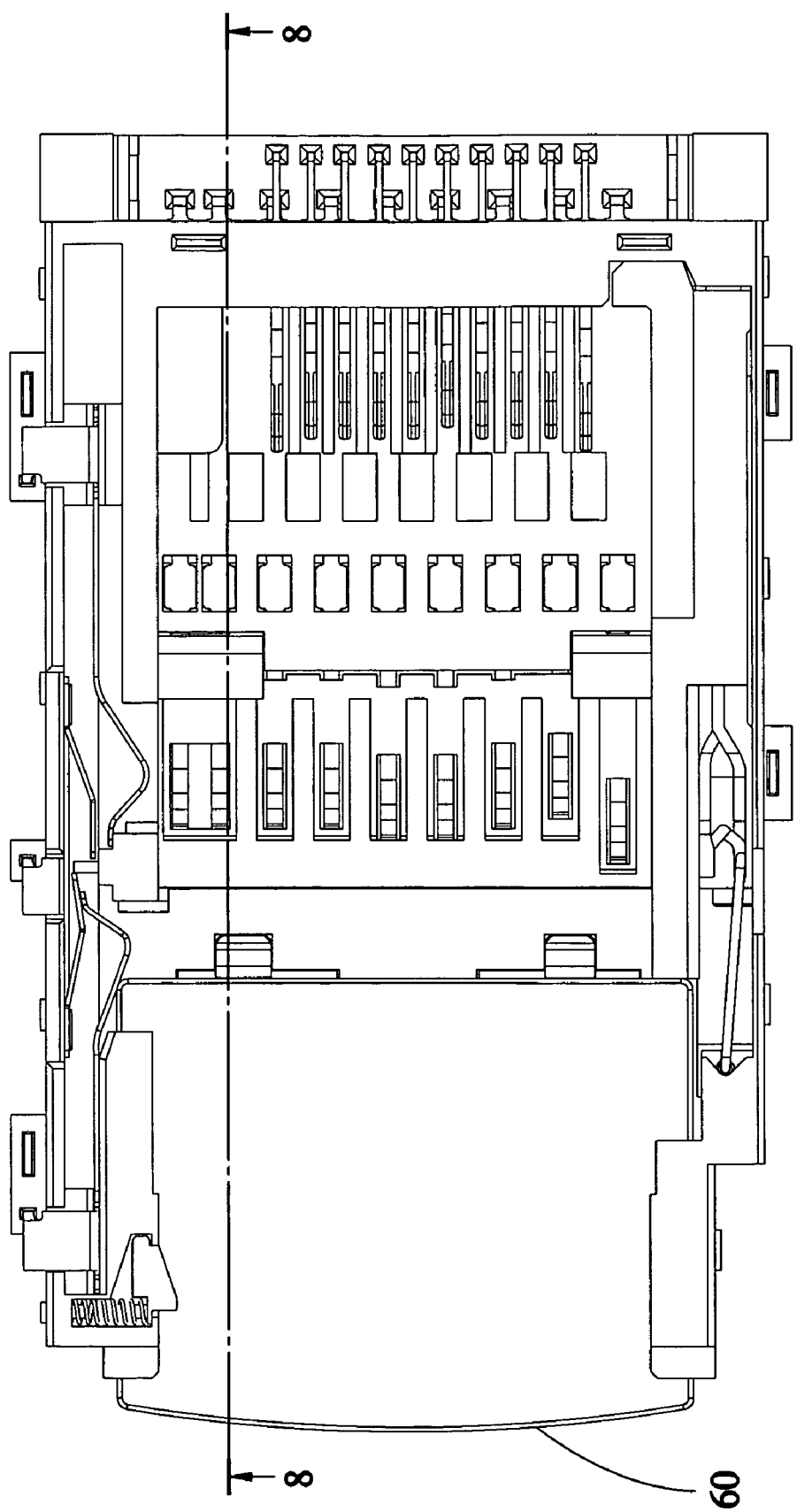
FIG. 7 is a top view of the present invention, showing an XD card inserted into the housing.
Figure 8:
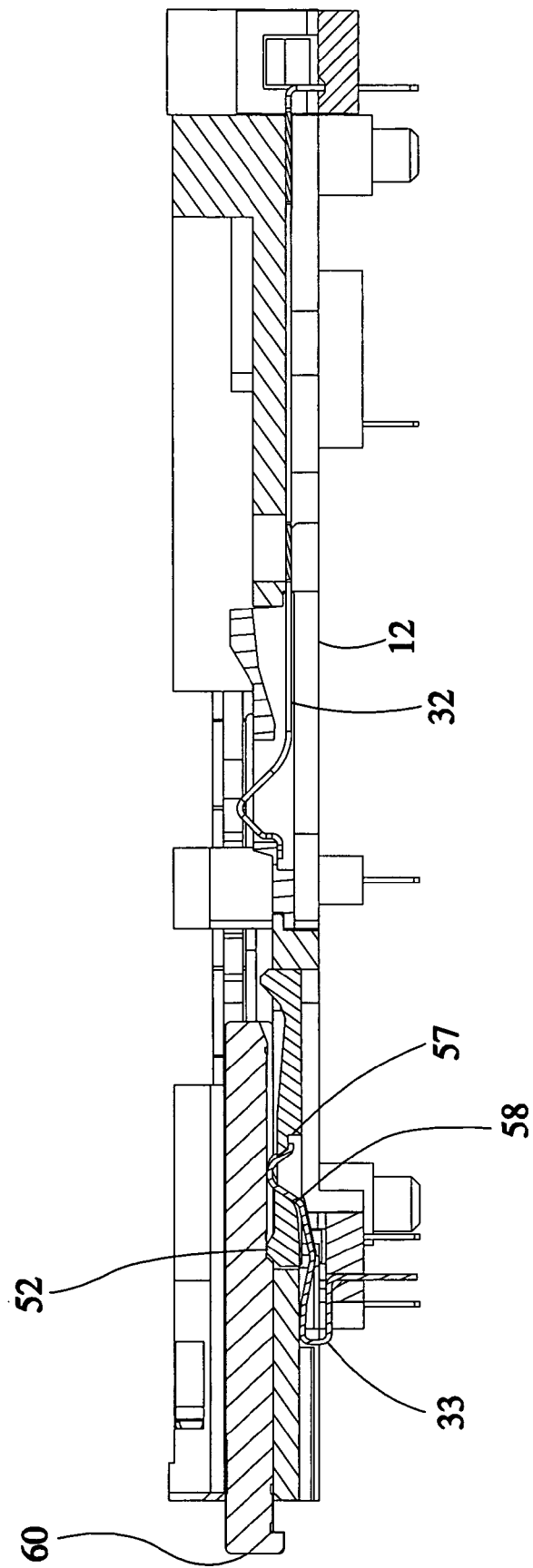
FIG. 8 is a sectional view taken along line 8-8 of FIG. 7.

Referring to FIG. 5 again, when the card connector is not inserted with any memory card, the first pressure board 40 and the second pressure board 50 are respectively lifted by the set of second metal terminals 32 and the set of third metal terminals 33. When an XD card 60 is completely inserted into the housing 11, as shown in FIGS. 6 and 7, the XD card 60 presses the protruding guide portions 52 of the second pressure board 50, and the metal contacts of the XD card 60 are kept in positive contact with the third metal terminals 33 that protrude through the second elongated slots 56 of the second pressure board 50.

Figure 9:
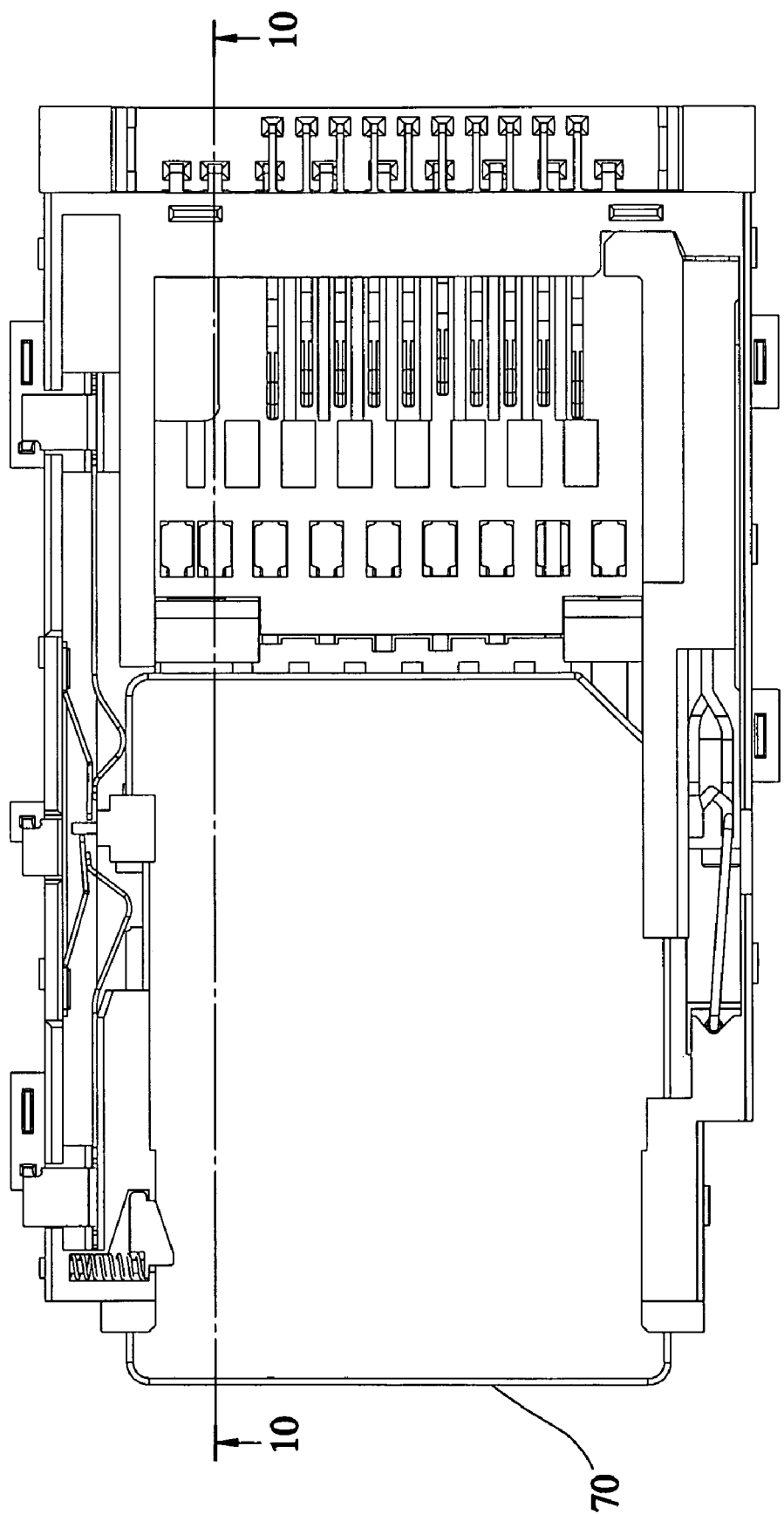
FIG. 9 is a top view of the present invention, showing an SD card inserted into the housing.
Figure 10:
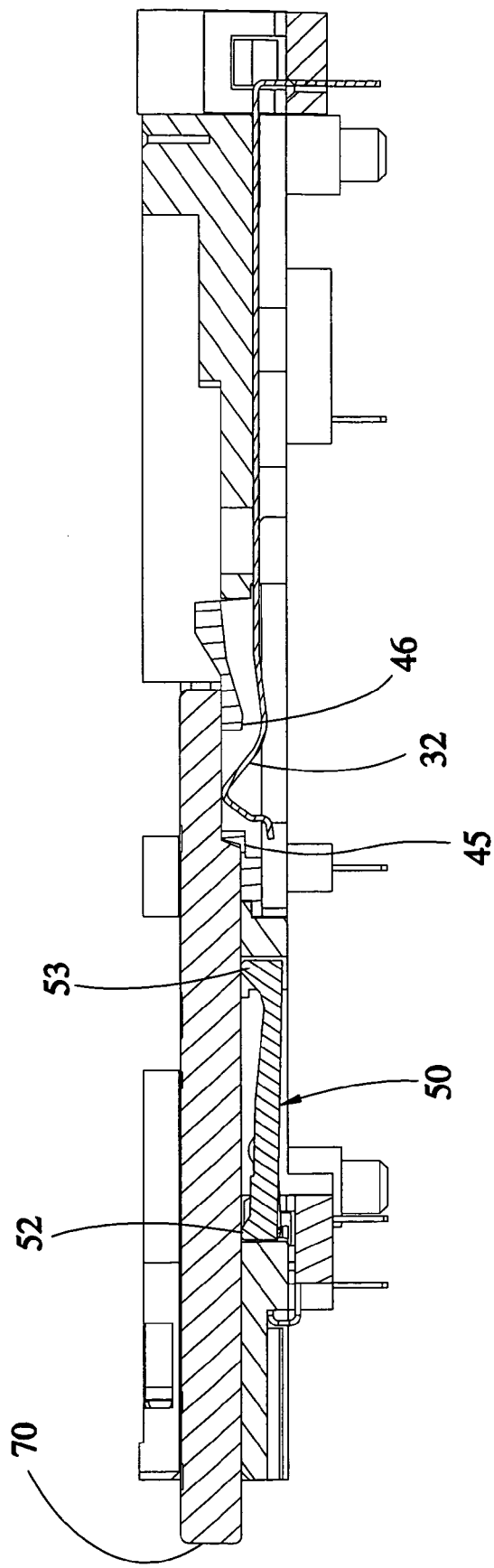
FIG. 10 is a sectional view taken along line 10-10 of FIG. 9.

Referring to FIGS. 9 and 10, when a SD card 70 is inserted into the housing 11, the bottom wall of the SD card 70 is directly pressed on the protruding guide portions 52 and second bearing portions 53 of the second pressure board 50 to force the second pressure board 50 downwards, causing the second press portions 58 to force the third metal terminals 33 downwards, preventing contact between the third metal terminals 33 and the inserted SD card 70. After the SD card 70 has been fully inserted in the housing 11 into position, the metal contacts of the SD card 70 are kept in positive contact with the second metal terminals 32 that protrude through the first elongated slots 44 of the first pressure board 40. When removing the inserted SD card 70 from the card connector, the third metal terminals 33 will return to their former position only after the SD card 70 has been completely moved away from the second pressure board 50, achieving protection of the third metal terminals 33.

Figure 11:
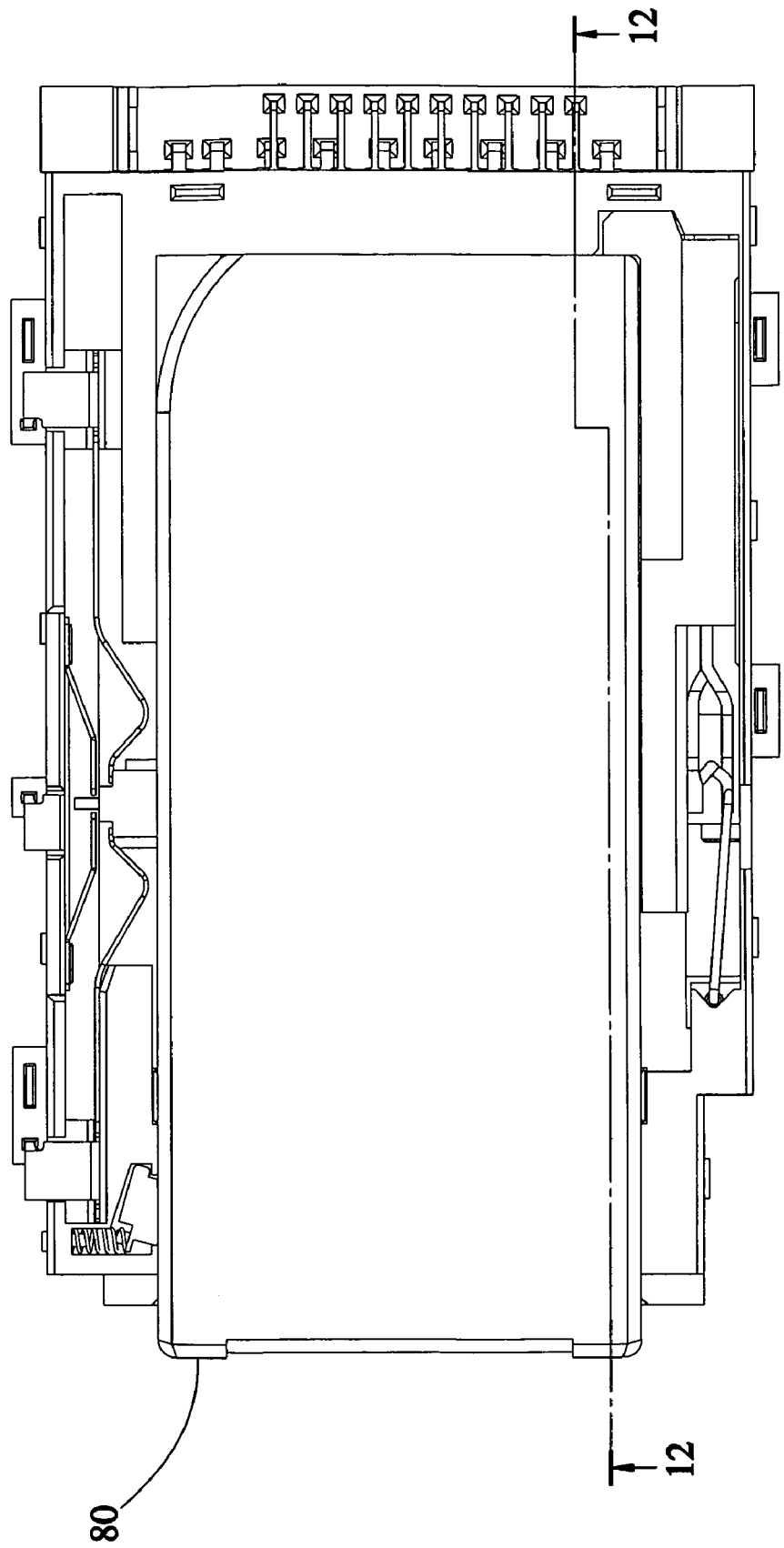
FIG. 11 is a top view of the present invention, showing a MS card inserted into the housing.
Figure 12:
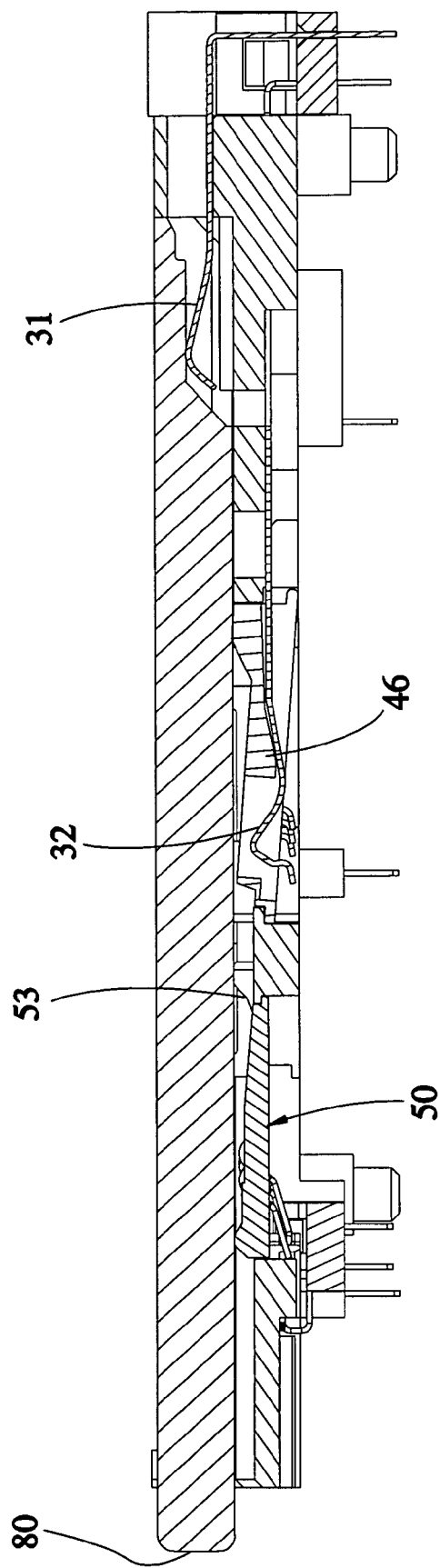
FIG. 12 is a sectional view taken along line 12-12 of FIG. 11.

Referring to FIGS. 11 and 12, when a MS card 80 is fully inserted into the housing 11, the bottom wall of the inserted MS card 80 is directly pressed on the first bearing portions 43 of the first pressure board 40 and the second bearing portions 53 of the second pressure board 50, causing the first press portion 46 and the second press portion 58 to force the second metal terminals 32 and the third metal terminals 33 downwards, preventing contact between the second and third metal terminals 32 and 33 and the inserted MS card 80, and allowing direction contact of the metal contacts of the inserted MS card 80 with the first metal terminals 32, achieving protection of the second and third metal terminals 32 and 33.

In conclusion, the invention has the advantages as follows:

1. Positive terminal holding-down function: Because the first and second pressure boards are vertically movably supported in the respective accommodation chambers by the respective metal terminals, the respective pressure boards will positively force the respective metal terminals downwards upon insertion of a memory card into the housing.

2. Simple structure design: By means of matching the first pressure board and the second pressure board with the configurations of the respective accommodation chambers to fit different memory cards, the pressure boards are vertically movable along the peripheral walls of the respective accommodation chambers to achieve the desired metal terminal protection function without any complicated pivot structure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A card connector comprising:
   a housing, said housing having a front side, a rear side, at least one accommodation chamber defined therein between said front side and said rear side, and an opening formed in said front side;
   at least one set of metal terminals mounted in said housing, said metal terminals each having a body projecting into said at least one accommodation chamber and curving upwardly forwards; and
   at least one pressure board vertically movably mounted in said at least one accommodation chamber, said at least one pressure board each comprising a plurality of slots cut through top and bottom sides thereof and adapted for receiving said at least one set of metal terminals and having at least one bearing portion disposed at a rear side thereof and protruding over a top wall of the respective pressure board, wherein said at least one accommodation chamber each has a protrusion protruded from the periphery thereof; said at least one pressure board each has a locating notch that receives the protrusion of one said at least one accommodation chamber, and two bearing portions disposed at two sides of said locating notch.

2. The card connector as claimed in claim 1, wherein said at least one accommodation chamber each has at least one step; said at least one pressure board is respectively accommodated in said at least one accommodation chamber, each having a shoulder at one side thereof for stopping against the at least one step of the respective accommodation chamber.

3. The card connector as claimed in claim 1, wherein said at least one pressure board has a guide portion protruding over a top wall thereof.

4. The card connector as claimed in claim 1, wherein said at least one pressure board has a support portion at a rear bottom side of each of the slots thereof and a press portion at a front bottom side of each of the slots thereof; the bodies of said metal terminals are respectively stopped at the support portions of said at least one pressure board.

5. The card connector as claimed in claim 1, wherein said at least one pressure board has a support portion at a front bottom side of each of the slots thereof and a press portion at a rear bottom side of each of the slots thereof; the bodies of said metal terminals are respectively stopped at the support portions of said at least one pressure board.

6. The card connector as claimed in claim 1, wherein said at least one set of metal terminals include a set of first metal terminals fitting a memory card of MS (Memory Stick) standard, a set of second metal terminals fitting a memory card of SD (Secure Digital)/MMC (Multi-Media Card) standard, and a set of third metal terminals fitting a memory card of XD (extreme Digital) standard.

* * * * *